United States Patent Office 3,557,183
Patented Jan. 19, 1971

3,557,183
α-CYANOETHYL N-3,5-DICHLOROPHENYL-CARBAMATE
Tetsuji Ishiyama, Kamakura-shi, and Keizo Hamuro, Nishinomiya-shi, Japan, assignors to Sumitomo Chemical Company, Ltd., Higashi-ku, Osaka, Japan, a corporation of Japan
No Drawing. Filed Sept. 18, 1967, Ser. No. 668,651
Claims priority, application Japan, Sept. 22, 1966, 41/62,769
Int. Cl. C07c *125/04;* A01n *9/20*
U.S. Cl. 260—465                                        1 Claim

ABSTRACT OF THE DISCLOSURE

Fungicidal compound represented by the formula,

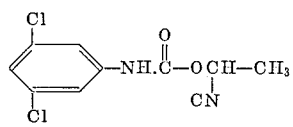

which exhibits low toxicity and has high preventive and exterminative effects on such fungi as *Pyricularia oryzae* Cav., *Cochliobous miyabeanus* (S. Ito et Kurib.) Drech., *Gibberella fujikuroi* (Saw.) Woll., *Helminthosporium sigmoideum* Cav., Hormodendrum sp., and *Alternaria kikuchiana* Tanaka. The above compound is prepared easily and at low cost by the condensation of substituted anilines with α-cyanoethyl chlorocarbonate or of substituted N-phenylcarbamoyl chlorides with α-cyanoethyl alcohol, or by the reaction of substituted phenyl isocyanates with α-cyanoethyl alcohol.

---

This invention relates to a fungicidal composition containing inert carrier and as an active ingredient at least one compound represented by the formula,

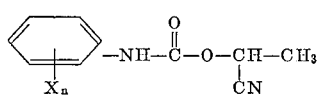

wherein X is chlorine and/or methyl; and *n* is an integer of 1 to 5.

Organo mercury type fungicides, which have heretofore been used most commonly as agricultural fungicides, have marked effects on various diseases of agricultural and horticultural products. For example, they display strong preventive and exterminative effects not only against rice blast, which is a main disease of rice plants, but also against various diseases caused by pathogenic fungi raging at the growth stage of rice plants, such as *Cochliobolus miyabeanus* (S. Ito et Kurib.) Drech., *Helminthosporium sigmoideum* Cav. and the like. However, these organo mercury fungicides are toxic to mammals and fishes, like the other poisonous commercial fungicides.

An object of the present invention is to provide agricultural and horticultural fungicides which are less toxic to mammals and are effective towards a wide variety of plant diseases.

Another object of the invention is to provide a method for preparing, with ease and at low costs, novel compounds which are active ingredients applied in said agricultural and horticultural fungicides.

The present inventors have found that the novel compounds of the present invention are less toxic and have high preventive and curative effects on such fungi as *Pyricularia oryzae* Cav., *Cochliobolus miyabeanus* (S. Ito et Kurib.) Drech., *Gibberella fujikuroi* (Saw.) Woll., *Helminthosporium sigmoideum* Cav., Hormodendrum sp., and *Alternaria kikuchiana* Tanaka.

The present compounds are prepared, in general, by the condensation of substituted anilines represented by the general formula,

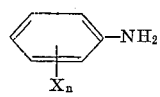

wherein X and *n* are as defined above, with α-cyanoethyl chloroformate of the formula,

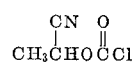

or of substituted N-phenylcarbamoyl chlorides represented by the formula,

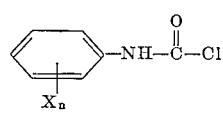

wherein X and *n* are as defined above, with α-cyanoethyl alcohol of the formula,

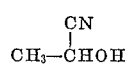

Alternatively, the compounds are prepared by the reaction of substituted phenyl isocyanates represented by the formula,

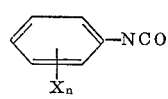

wherein X and *n* are as defined above, with α-cyanoethyl alcohol.

Compounds which art considered particularly useful among the present compounds are, for example, those shown in Table 1, but the scope of the present invention is not necessarily limited thereto.

TABLE 1.—Examples of present compounds

| Number: | Structure | Name |
|---|---|---|
| 1 | | α-Cyanoethyl N-2-chlorophenyl-carbamate. |
| 2 | | α-Cyanoethyl N-2,3-dichlorophenylcarbamate. |
| 3 | | α-Cyanoethyl N-2,5-dichlorophenylcarbamate. |
| 4 | | α-Cyanoethyl N-3,5-dichlorophenylcarbamate. |
| 5 | | α-Cyanoethyl N-2,4,6-trichlorophenylcarbamate. |
| 6 | | α-Cyanoethyl N-2,4,5-trichlorophenylcarbamate. |
| 7 | | α-Cyanoethyl N-2,3,4,5,6-pentachlorophenyl-carbamate. |
| 8 | | α-Cyanoethyl N-3-methylphenyl-carbamate. |
| 9 | | α-Cyanoethyl N-2,3-dimethylphenylcarbamate. |
| 10 | | α-Cyanoethyl N-2,4-dimethylphenylcarbamate. |
| 11 | | α-Cyanoethyl N-2,6-dimethylphenyl-carbamate. |
| 12 | | α-Cyanoethyl N-3,5-dimethylphenyl-carbamate. |
| 13 | | α-Cyanoethyl N-3,4-dimethylphenyl-carbamate. |
| 14 | | α-Cyanoethyl N-2,5-dimethylphenyl-carbamate. |
| 15 | | α-Cyanoethyl N-3-methyl-2,4,6-trichloro-phenyl-carbamate. |

The effects of the above compounds on various fungi (i.e., the following 6 plant pathogenic fungi) is shown below:

(a) *Pyricularia oryzae* Cav. (abbreviated as P.o.)
(b) *Cochlioborus miyabeanus* (S. Ito et Kurib.) Drech. (abbreviated as C.m.)
(c) *Gibberella fujikuroi* (Saw.) Woll. (abbreviated as G.f.)
(d) *Helminthosporium sigmoideum* Cav. (abbreviated as H.s.)
(e) *Hormodendrum* sq. (abbreviated as Hormo)
(f) *Alternaria kikuchiana* Tanaka (abbreviated as A.k.)

Using a 2% glucose-containing potato juice agar, solutions at various concentrations of each test sample in acetone were individually diluted to 20 times. 20 ml. of each diluted solution was charged in a Petri dish of 10 cm. in inner diameter to form a plate. On the plate, spores of the above-mentioned 6 fungi were individually streaked. 7 days after inoculation of fungi, the mycelium growth inhibition concentration (mcg./ml.) of each test solution was observed. The results obtained is as set forth in Table 2.

TABLE 2
[Effects on various pathogenic fungi (represented by mycelium growth inhibition concentration mcg./ml.)]

| Compound Number in Table 1: | P.o. | C.m. | G.f. | H.s. | Hormo | A.k. |
|---|---|---|---|---|---|---|
| 1 | 500 | 1,500 | 1,250 | 500 | 1,250 | 1,500 |
| 2 | 150 | 1,500 | 1,250 | 1,000 | 1,000 | 1,500 |
| 3 | 300 | 500 | 1,000 | 500 | 500 | 300 |
| 4 | 125 | 40 | 500 | 125 | 125 | 50 |
| 5 | 300 | 100 | 1,000 | 125 | 125 | 50 |
| 6 | 300 | 100 | 500 | 125 | 125 | 100 |
| 7 | 125 | 100 | 300 | 500 | 50 | 100 |
| 8 | 500 | 1,000 | 1,500 | 500 | 1,500 | 1,000 |
| 9 | 150 | 2,000 | 1,000 | 1,000 | 1,000 | 1,500 |
| 10 | 300 | 200 | 500 | 200 | 200 | 300 |
| 11 | 300 | 100 | 1,000 | 1,500 | 1,500 | 1,500 |
| 12 | 200 | 50 | 100 | 1,000 | 500 | 100 |
| 13 | 500 | 200 | 1,000 | 200 | 200 | 1,000 |
| 14 | 1,500 | 1,500 | 200 | 500 | 500 | 500 |
| 15 | 100 | 100 | 500 | 100 | 100 | 100 |

As shown in Table 2, the present compounds are effective to various plant pathogenic fungi. Although the compounds are not always high in activity to inhibit the germination of conidia of *Cochlioborus miyabeanus* (S. Ito et Kurib.) Drech., they have such characteristics worthy of special mention as displaying specific actions to inhibit the growth of mycelia and showing prolonged durability. Further, most of the compounds have considerably high preventive and curative effects on *Helminthosporium sigmoideum* Cav.

The present compounds may be utilized in any form of conventionally known formulations such as emulsifiable concentrations, wettable powders, granules, dusts and tablets, using as active ingredient at least one compound represented by the aforesaid formula. In case the compounds are to be used in the form of powders or solids such as wettable powders, dusts, granules and tablets, there are used as excipients or extenders (i.e. carrier) siliceous fine powders such as clay, talc, Kaolin and diatomaceous earth, inorganic powders such as carbon, gypsum and calcium carbide, or organic powders such as starch and carboxymethyl cellulose. In the case of emulsifiable concentrations, common cyclic or chain hydrocarbons, or alcohols, ketones, esters and ethers derived therefrom may be used as solvents, and nonionic surface active agents, and if necessary anionic or cationic surface active agents, lignin sulfonates or polyvinyl alcohols may also be used as assistant agents therefor.

The present invention will be illustrated below with reference to typical examples and test examples. In practice, however, the present compounds may be used in admixture with known fungicides, insecticides, herbicides, fertilizers and nematocides, etc.

EXAMPLE 1

20 parts of the present compound No. 3 and 77 parts of a finely powdered clay-talc mixture were thoroughly stirred in a mortar. The stirring was further continued, while adding dropwise 3 parts of "Sorpol 2020" (registered trade name for an emulsifier produced by Toho Kagaku K.K.), and thus the mixture was homogenized to obtain 100 parts of a 20% wettable powder.

EXAMPLE 2

40 parts of the present compound No. 4, 40 parts of xylene and 20 parts of "Sorpol 2020" (registered trade name for an emulsifier produced by Toho Kagaku K.K.) were mixed and dissolved each other to obtain 100 parts of an emulsifiable concentration.

EXAMPLE 3

2 parts of the present compound No. 4, 7 parts of a finely powdered clay-talc mixture and 1 part of powdery calcium stearate were pre-mixed in a mixer. The resulting mixture was then uniformly diluted by addition of 90 parts of said finely divided clay-talc mixture to obtain 100 parts of a 2% dust.

EXAMPLE 4

40 parts of the present compound No. 3 and 57 parts of a finely powdered clay-talc mixture were mixed with each other in a mortar. To the resulting mixture, 3 parts of "Sorpol 2020" (registered trade name for an emulsifier produced by Toho Kagaku K.K.) was added dropwise. Subsequently, the mixture was homogenized to obtain 100 parts of a 40% wettable powder.

EXAMPLE 5

3 parts of the present compound No. 8 was formulated according to the same procedure as in Example 3 to obtain 100 parts of a 3% dust.

EXAMPLE 6

40 parts of the present compound No. 12 was formulated according to the same procedure as in Example 2 to obtain 100 parts of a 4% wettable powder.

The effects of the present formulations are as shown in the following test examples:

TEST EXAMPLE 1

Rice plants (Norin No. 2, seedlings at the 3-leaved stage), which had been cultivated in pots, were individually sprayed with an emulsion prepared by diluting with water to an active ingredient concentration of 500 p.p.m., each of the present emulsifiable concentrations formulated in the same manner as in Example 2. On the next day, the rice plants were inoculated with spores of *Pyricularia oryzae* Cav. 6 days after the inoculation of spores, the number of progressing disease spots per leaf was counted to calculate the ratio (percent) of the number of reduced disease spots in the treated areas to the number of disease spots in non-treated areas. The calculated ratios were regarded as inhibitory ratios. The results were as shown in Table 3.

TABLE 3

| Sample | Concentration, p.p.m. | Inhibitory ratio, percent |
|---|---|---|
| Compound Number: | | |
| 1 | 500 | 10.7 |
| 2 | 500 | 37.2 |
| 3 | 500 | 49.0 |
| 4 | 500 | 75.2 |
| 7 | 500 | 71.4 |
| 8 | 500 | 9.8 |
| 12 | 500 | 63.0 |
| 5 | 500 | 53.6 |
| 15 | 500 | 48.8 |
| Untreated | | 0 |

TEST EXAMPLE 2

The same rice plants as in Test Example 1 were individually applied with 150 mg. per pot of each of dusts formulated in the same manner as in Example 3. On the next day, the rice plants were inoculated with spores of *Pyricularia oryzae* Cav. 6 days after the inoculation, inhibitory ratios were calculated in the same manner as in Test Example 1. The results were as shown in Table 4.

TABLE 4

| Sample: | Applied amount mg./pot | Inhibitory ratio, percent |
| --- | --- | --- |
| 2% dust of compound number 4 | 150 | 81.3 |
| 3% dust of compound number 8 | 150 | 31.0 |
| Untreated | | 0 |

TEST EXAMPLE 3

Rice plants (Norin No. 21, seedlings at the 4-leaved stage), which had been cultivated in pots, were individually sprayed with a solution prepared by dissolving in water to an active ingredient concentration of 500 p.p.m. each of the present wettable powders formulated in the same manner as in Example 1. On the next day, the rice plants were inoculated with spores of *Cochlioborus miyabeanus* (S. Ito et Kurib.) Drech. 6 days after the inoculation the number of disease spots per leaf was counted. The results were as shown in Table 5.

TABLE 5

| Samples | Concen. tration, p.p.m. | Number of disease spots per leaf |
| --- | --- | --- |
| Compound number: | | |
| 1 | 500 | 46.9 |
| 2 | 500 | 20.5 |
| 3 | 500 | 7.0 |
| 4 | 500 | 5.7 |
| 6 | 500 | 9.2 |
| 11 | 500 | 13.5 |
| 13 | 500 | 31.0 |
| Triazine | 500 | 6.2 |
| Phenylmercury iodide | [1] 20 | 5.3 |
| Untreated | | 50.6 |

[1] As mercury.

We claim:
1. α-Cyanoethyl N-3,5-dichlorophenyl-carbamate having the formula,

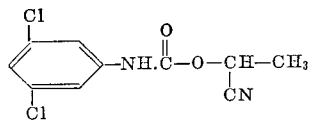

References Cited

UNITED STATES PATENTS

| 2,789,129 | 4/1957 | Bissinger | 260—465X |
| 3,036,112 | 5/1962 | Lynn | 260—465 |
| 3,245,774 | 4/1966 | Bachmann | 260—465X |

FOREIGN PATENTS

| 586,675 | 11/1959 | Canada | 260—465 |

CHARLES B. PARKER, Primary Examiner

DOLPH H. TORRENCE, Assistant Examiner

U.S. Cl. X.R.

260—453, 465.4, 465.6, 543; 424—304